(12) United States Patent
Feng et al.

(10) Patent No.: US 7,794,796 B2
(45) Date of Patent: Sep. 14, 2010

(54) EXTENSIBLE ARTIFICIAL LEATHER AND METHOD FOR MAKING THE SAME

(75) Inventors: Chung-Chih Feng, Kaohsiung (TW); Chun-Wei Wu, Niaosong Shiang (TW); Kun-Lin Chiang, Ziguan Shiang (TW); Yung-Ching Huang, Kaohsiung (TW)

(73) Assignee: San Fang Chemical Industry Co., Ltd., Kaohsiung County (TW)

( * ) Notice: Subject to any disclaimer, the term of this patent is extended or adjusted under 35 U.S.C. 154(b) by 674 days.

(21) Appl. No.: 11/618,960

(22) Filed: Jan. 2, 2007

(65) Prior Publication Data

US 2008/0145613 A1 Jun. 19, 2008

(30) Foreign Application Priority Data

Dec. 13, 2006 (TW) .............................. 95146726 A

(51) Int. Cl.
*B05D 1/38* (2006.01)
(52) U.S. Cl. .................... 427/412; 427/372.2; 427/373; 427/407.1
(58) Field of Classification Search .............. 472/372.2, 472/373, 407.1, 412
See application file for complete search history.

(56) References Cited

U.S. PATENT DOCUMENTS

| | | | | |
|---|---|---|---|---|
| 2,116,289 | A | 5/1938 | Shepherd | 118/212 |
| 3,248,371 | A | 4/1966 | Damusis | 528/45 |
| 3,383,273 | A | 5/1968 | Roland et al. | 442/352 |
| 3,496,001 | A | 2/1970 | Minobe et al. | 428/91 |
| 3,531,368 | A | 9/1970 | Okamoto et al. | |
| 3,590,112 | A | 6/1971 | Civardi | 264/321 |
| 3,716,614 | A | 2/1973 | Okamoto et al. | 264/49 |
| 3,770,481 | A * | 11/1973 | Canat | 428/151 |
| 3,835,212 | A | 9/1974 | Piacente | 264/76 |
| 3,841,897 | A | 10/1974 | Okazaki et al. | 428/151 |
| 3,865,678 | A | 2/1975 | Okamoto et al. | 428/91 |
| 3,900,549 | A | 8/1975 | Yamane et al. | 264/172.13 |
| 3,917,784 | A | 11/1975 | Nishida | 264/103 |
| 3,924,045 | A | 12/1975 | Ogasawara et al. | 428/373 |

(Continued)

FOREIGN PATENT DOCUMENTS

CA 2385307 3/2001

(Continued)

OTHER PUBLICATIONS

Mesh Size and Micron Size: Coral Calcium Absorption. Internet Reference. URL: www.healthtreasures.com/mesh-microns.html.

*Primary Examiner*—Andrew T Piziali
(74) *Attorney, Agent, or Firm*—Alan Kamrath; Kamrath & Associates PA

(57) ABSTRACT

In a method for making extensible artificial leather, a substrate is supported on in-extensible woven cloth and firmly located on a coating machine. A highly solid-containing water-based polyurethane resin is coated on the substrate to form a middle layer with tiny open cells. The middle layer is dried, and the woven cloth is removed from the substrate. A superficial layer of polyurethane is attached to the middle layer in a dry process so that the extensible artificial leather is made with excellent strength against peeling, abrasion and dissolution.

3 Claims, 3 Drawing Sheets

U.S. PATENT DOCUMENTS

| | | | | |
|---|---|---|---|---|
| 3,989,869 | A | 11/1976 | Neumaier et al. | 442/226 |
| 4,018,954 | A | 4/1977 | Fukushima et al. | 428/86 |
| 4,045,598 | A | 8/1977 | Henson | 427/296 |
| 4,067,833 | A | 1/1978 | Austin et al. | 521/164 |
| 4,096,104 | A | 6/1978 | Spain et al. | 427/227 |
| 4,145,468 | A | 3/1979 | Mizoguchi et al. | 428/239 |
| 4,216,251 | A | 8/1980 | Nishimura et al. | 427/370 |
| 4,248,652 | A * | 2/1981 | Civardi et al. | 156/219 |
| 4,250,308 | A | 2/1981 | Goedecke et al. | 544/190 |
| 4,259,384 | A | 3/1981 | Veiga et al. | 428/97 |
| 4,342,805 | A | 8/1982 | McCartney | 428/151 |
| 4,363,845 | A | 12/1982 | Hartmann | 428/198 |
| 4,433,095 | A | 2/1984 | Hombach et al. | 524/563 |
| 4,476,186 | A | 10/1984 | Kato et al. | 442/60 |
| 4,557,972 | A | 12/1985 | Okamoto | 428/373 |
| 4,587,142 | A | 5/1986 | Higuchi et al. | 428/15 |
| 4,708,839 | A | 11/1987 | Bellet et al. | 264/85 |
| 4,728,552 | A | 3/1988 | Jensen, Jr. | 428/91 |
| 4,841,680 | A | 6/1989 | Hoffstein et al. | 51/283 |
| 4,927,432 | A | 5/1990 | Budinger et al. | 51/298 |
| 4,954,141 | A | 9/1990 | Takiyama et al. | 51/296 |
| 4,966,808 | A | 10/1990 | Kawano | 442/201 |
| 4,997,876 | A | 3/1991 | Scarso | 524/706 |
| 5,020,283 | A | 6/1991 | Tuttle | 51/209 |
| 5,094,670 | A | 3/1992 | Imada | 51/293 |
| 5,124,194 | A | 6/1992 | Kawano | 442/201 |
| 5,197,999 | A | 3/1993 | Thomas | 51/294 |
| 5,212,910 | A | 5/1993 | Breivogel et al. | 51/398 |
| 5,216,843 | A | 6/1993 | Breivogel et al. | 51/131.1 |
| 5,225,267 | A | 7/1993 | Ochi et al. | 428/214 |
| 5,242,750 | A | 9/1993 | Wagner et al. | 428/316.6 |
| 5,290,626 | A | 3/1994 | Nishioi et al. | 442/201 |
| 5,297,364 | A | 3/1994 | Tuttle | 51/209 |
| 5,394,655 | A | 3/1995 | Allen et al. | 451/63 |
| 5,482,756 | A | 1/1996 | Berger et al. | 428/36.2 |
| 5,484,646 | A | 1/1996 | Mann | 428/198 |
| 5,489,233 | A | 2/1996 | Cook et al. | 451/41 |
| 5,503,899 | A | 4/1996 | Ashida et al. | 428/151 |
| 5,510,175 | A | 4/1996 | Shiozawa | 442/77 |
| 5,518,800 | A | 5/1996 | Okawa et al. | 428/151 |
| 5,533,923 | A | 7/1996 | Shamouilian et al. | 451/41 |
| 5,554,064 | A | 9/1996 | Breivogel et al. | 451/41 |
| 5,562,530 | A | 10/1996 | Runnels et al. | 451/36 |
| 5,611,943 | A | 3/1997 | Cadien et al. | 216/88 |
| 5,662,966 | A | 9/1997 | Kobayashi | 427/385.5 |
| 5,993,943 | A | 11/1999 | Bodaghi et al. | 428/198 |
| 6,089,965 | A | 7/2000 | Otawa et al. | 451/527 |
| 6,159,581 | A | 12/2000 | Yoneda et al. | 428/195 |
| 6,322,851 | B1 | 11/2001 | Adachi et al. | 427/246 |
| 6,451,404 | B1 | 9/2002 | Nobuto et al. | 428/91 |
| 6,451,716 | B1 | 9/2002 | Sasaki et al. | 442/77 |
| 6,468,651 | B2 | 10/2002 | Aikawa et al. | 428/364 |
| 6,479,153 | B1 | 11/2002 | Kato et al. | 428/423.7 |
| 6,515,223 | B2 | 2/2003 | Tashjian | 174/35 R |
| 6,517,938 | B1 | 2/2003 | Andoh et al. | 428/395 |
| 6,528,139 | B2 | 3/2003 | Hoyt et al. | 428/97 |
| 6,583,075 | B1 | 6/2003 | Dugan | 442/337 |
| 6,613,867 | B2 | 9/2003 | Sonnenschein et al. | 528/76 |
| 6,767,853 | B1 | 7/2004 | Nakayama et al. | 442/361 |
| 6,794,446 | B1 | 9/2004 | Takeda et al. | 524/590 |
| 6,852,392 | B2 | 2/2005 | Kikuchi et al. | 428/166 |
| 6,852,418 | B1 | 2/2005 | Zurbig et al. | 428/423.1 |
| 6,860,802 | B1 | 3/2005 | Vishwanathan et al. | 451/527 |
| 7,025,915 | B2 | 4/2006 | Wang et al. | 264/103 |
| 2002/0013984 | A1 | 2/2002 | Makiyama et al. | 28/103 |
| 2002/0015822 | A1 | 2/2002 | Wang et al. | 428/151 |
| 2002/0098756 | A1 | 7/2002 | Sasaki et al. | 442/77 |
| 2003/0034584 | A1 | 2/2003 | Wang et al. | 264/172 |
| 2003/0139110 | A1 | 7/2003 | Nagaoka et al. | |
| 2004/0045145 | A1 | 3/2004 | Wang et al. | 28/168 |
| 2004/0063370 | A1 | 4/2004 | Makiyama et al. | 442/363 |
| 2004/0142148 | A1 | 7/2004 | Feng et al. | 428/151 |
| 2004/0191412 | A1 | 9/2004 | Wang et al. | 427/245 |
| 2004/0253404 | A1 | 12/2004 | Wang et al. | 428/41.8 |
| 2005/0032450 | A1 | 2/2005 | Haggard et al. | 442/327 |
| 2005/0100710 | A1 | 5/2005 | Feng et al. | 428/151 |
| 2005/0181124 | A1 * | 8/2005 | Hoersch | 427/176 |
| 2005/0244654 | A1 | 11/2005 | Wang et al. | 428/423.1 |
| 2005/0260416 | A1 | 11/2005 | Wang et al. | 428/423.1 |
| 2006/0046597 | A1 | 3/2006 | Wang et al. | 442/394 |
| 2006/0057432 | A1 | 3/2006 | Feng et al. | 428/904 |
| 2006/0147642 | A1 | 7/2006 | Wang et al. | 427/430.1 |
| 2006/0160449 | A1 | 7/2006 | Wang et al. | 442/182 |
| 2006/0218729 | A1 | 10/2006 | Feng | 8/94.15 |
| 2006/0249244 | A1 | 11/2006 | Wang et al. | 156/239 |
| 2006/0263601 | A1 | 11/2006 | Wang et al. | 428/373 |
| 2006/0272770 | A1 | 12/2006 | Lee et al. | 156/322 |

FOREIGN PATENT DOCUMENTS

| | | |
|---|---|---|
| CN | 1346912 | 5/2002 |
| DE | 3536371 | 5/1987 |
| DE | 10100814 | 7/2001 |
| EP | 1041191 | 10/2000 |
| EP | 1054096 | 11/2000 |
| JP | 52047896 | 4/1977 |
| JP | 55051076 | 4/1980 |
| JP | 05117584 | 5/1993 |
| JP | 06192969 | 7/1994 |
| JP | 08291454 | 11/1996 |
| JP | 09059881 | 3/1997 |
| JP | 11093082 | 4/1999 |
| JP | 2000045186 | 2/2000 |
| JP | 200248431 | 9/2000 |
| KR | 2002004295 | 1/2002 |
| WO | WO 9615887 | 5/1996 |
| WO | WO 0002707 | 1/2000 |
| WO | WO2004044028 | 5/2004 |

* cited by examiner

EXTENSIBLE ARTIFICIAL LEATHER AND METHOD FOR MAKING THE SAME

BACKGROUND OF INVENTION

1. Field of Invention

The present invention relates to extensible artificial leather and a method for making the same.

2. Related Prior Art

A lot of artificial leather has been produced and used in balls, gloves, clothes, furniture, sports gear and the like. When used in sports shoes and sportswear where comfort is emphasized, extensible cloth with excellent elasticity and extensibility is advantageously used to make the artificial leather. The term "extensible cloth" is used to refer to cloth made with T-extensibility of 50% to 300% and Y-extensibility of 100% to 400%.

Artificial leather is conventionally made by wet processes. Fibers of Nylon and polyethylene terephthalate are made into non-woven cloth by needle bonding. The non-woven cloth is used as a substrate. The substrate is submerged in a solvent-type polyurethane resin compound. After curing, it is coated with a solvent-type polyurethane resin by a wet coating machine. After curing, washing and drying, a middle layer with tiny cells is formed on the substrate so that a semi-product of the artificial leather is made. Then, in a dry adhesive process, polyurethane resin is coated on the substrate and ground or pressed so that the artificial leather is made with good integrity, softness, feel and touch.

The substrate may be extensible cloth instead of the non-woven cloth in a process similar to the foregoing process. The extensible cloth, which includes fibers of polyethylene terephthalate, is submerged in a solvent-type polyurethane resin. The substrate is coated with a solvent-type polyurethane resin in a wet coating machine. After curing, washing and drying, a middle layer with tiny cells is formed on the substrate of extensible cloth. Grinding or pressing is used to make the extensible artificial leather.

The artificial leather made of the non-woven cloth in the wet process is excellent in the strength against peeling, abrasion and dissolution. However, the artificial leather made of the extensible cloth in the wet process includes poor strength against peeling (or peel strength) of 0.7 to 1.7 kg/cm. Its strength against abrasion and dissolution is poor, too. The strength against peeling, abrasion and dissolution is poor, since the extensible cloth sticks poorly to the solvent-type polyurethane resin. Other physical properties of the artificial leather are not stable, since the wet processes are long. Therefore, the quality of the artificial leather is often unstable, and the finishing of the same is often overdue.

The present invention is therefore intended to obviate or at least alleviate the problems encountered in the prior art.

SUMMARY OF INVENTION

It is an objective of the present invention to provide a short process for making extensible artificial leather with excellent strength against peeling, abrasion and dissolution.

It is another objective of the present invention to provide extensible artificial leather with excellent strength against peeling, abrasion and dissolution so that it is suitable for sports gear.

According to the present invention, a substrate is supported on in-extensible woven cloth and firmly located on a coating machine. A foamed highly solid-containing water-based polyurethane resin is coated on the substrate to form a middle layer with tiny open cells. The middle layer is dried on the substrate, and the woven cloth is removed from the substrate. A superficial layer of polyurethane is formed on the middle layer to make the extensible artificial leather. The extensible fabric is extensible cloth with T-extensibility of 50% to 300% and Y-extensibility of 100% to 400%.

In an embodiment, other in-extensible carrier is used to support the extensible substrate.

The solid content of the water-based polyurethane resin is 40% to 60% and preferably 50% to 60%. The extensibility of the extensible artificial leather would be affected if the solid content of the water-based polyurethane resin is too high. The highly solid-containing water-based polyurethane resin on the extensible substrate is a polyurethane resin compound that contains little solvent so that little organic solvent vaporizes.

The porosity of the highly solid-containing polyurethane resin is 0.01% to 80% by volume and preferably 2% to 65% by volume.

In an embodiment, the superficial layer is coated on plain or textured releasing paper before it is transferred to the middle layer.

According to the present invention, extensible artificial leather includes a substrate, a middle layer on the substrate and at least one superficial layer of polyurethane resin. The substrate is made of woven cloth with T-extensibility of 50% to 300% and Y-extensibility of 100% to 400%. The middle layer is made with a foamed structure of foamed highly solid-containing water-based polyurethane resin. Thus, the extensible artificial leather is made with excellent elasticity, extensibility and strength against peeling, abrasion and dissolution. Therefore, the extensible artificial leather is suitable for sports gear, clothes and the like that must provide comfort to users.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF EMBODIMENTS

Figure 1:
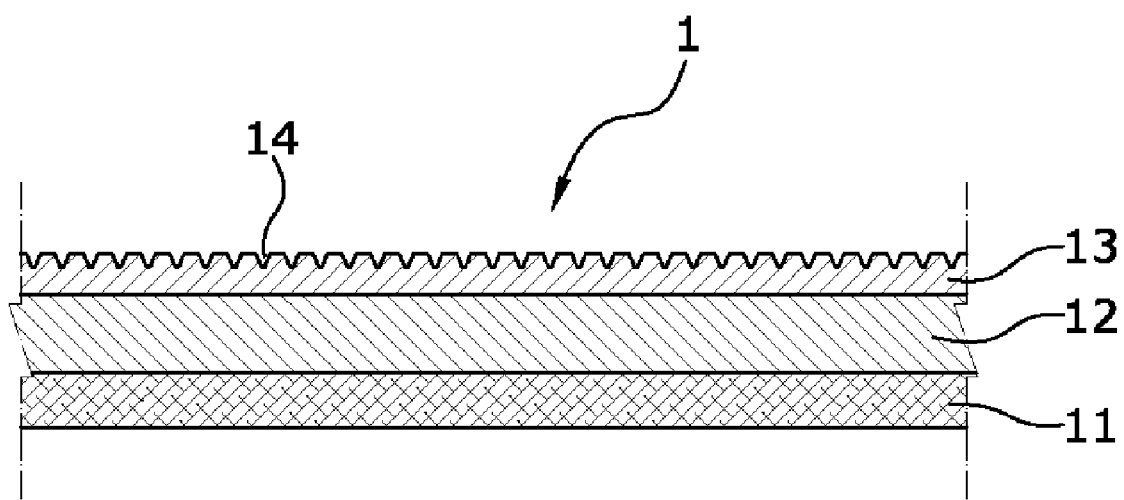
FIG. 1 is a cross-sectional view of artificial leather according to the present invention.

Referring to FIG. 1, there is shown extensible artificial leather 1 according to the present invention.

The extensible artificial leather 1 includes a substrate 11, a middle layer 12 provided on the substrate 11 and a superficial layer 13 provided on the middle layer 12. These layers are drawn for illustration; however, the ratio of the thickness thereof is not precise.

The substrate 11 is made of extensible fabric. The extensible fabric is woven cloth with T-extensibility of 50% to 300% and Y-extensibility of 100% to 400%.

The substrate 11 is woven of fibers made of at least one material selected from a group consisting of Nylon, polyethylene terephthalate, poly-olefin and poly-acrylic. Preferably, the substrate 11 is woven of 1% to 100% of Nylon fibers and 1% to 100% of polyethylene terephthalate.

The middle layer 12 is made of a highly solid-containing water-based polyurethane resin layer. The middle layer 12 includes a foamed structure.

The solid content of the highly solid-containing water-based polyurethane resin is 40% to 60% and preferably 50% to 60%. The porosity of the highly solid-containing water-based polyurethane resin is 0.01% to 80% by volume and preferably 2% to 65% by volume.

The superficial layer 13 is made of polyurethane and preferably made with a texture 14.

Figure 2:
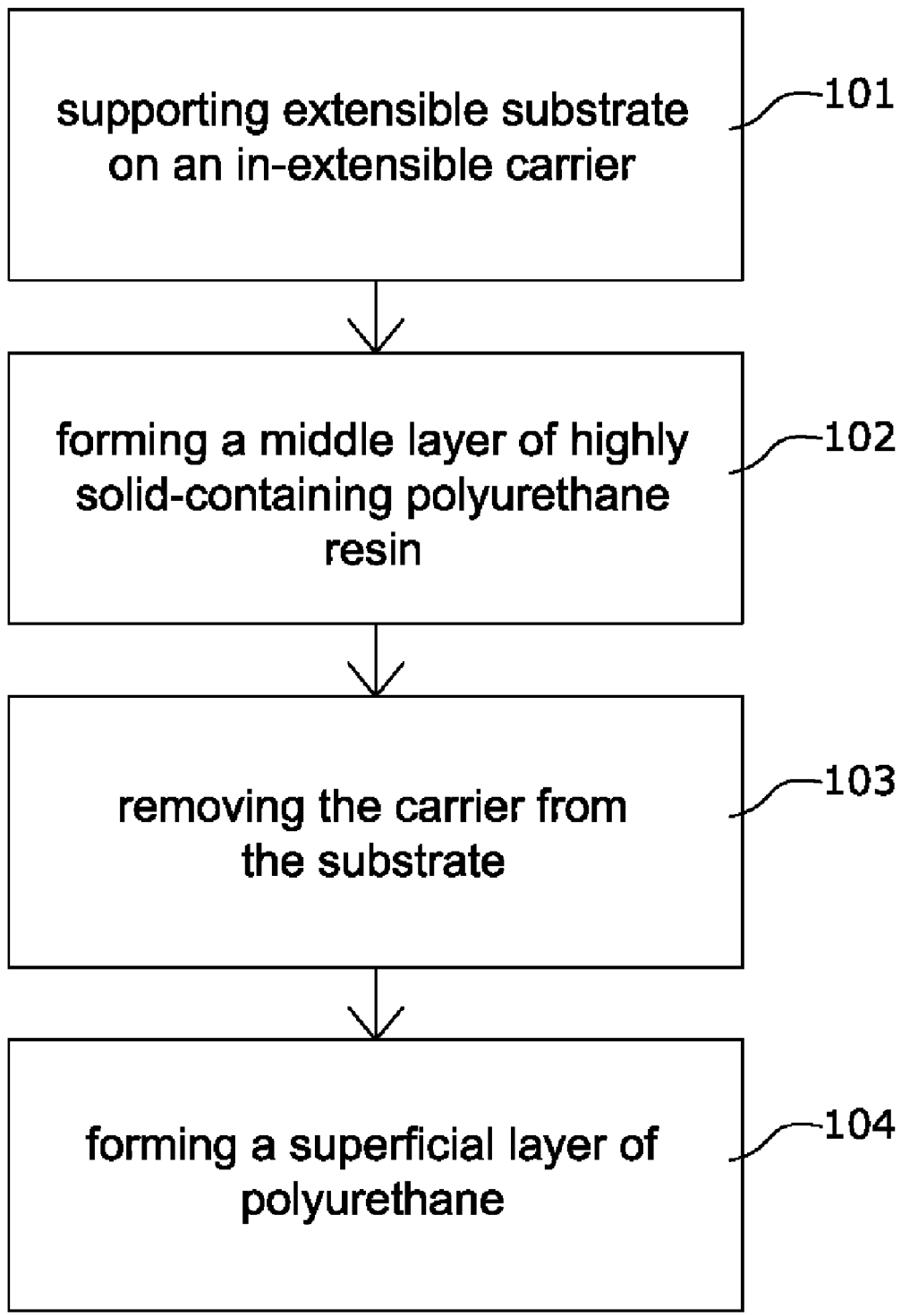
FIG. 2 is a flow chart of a method for making the artificial leather shown in FIG. 1.

The extensible artificial leather 1 may be made by a method as shown in FIG. 2. The method includes four steps 101 to 104.

Firstly, at step 101, the substrate 11 is located on an in-extensible carrier (not shown) so that the substrate 11 can be firmly located on a coating machine.

At step 102, the foamed highly solid-containing water-based polyurethane layer is coated on the substrate 11 so that the middle layer 12 is made with tiny open cells.

At step 103, the middle layer 12 is dried, and the carrier is removed.

At step 104, the superficial layer 13 is formed on the middle layer 12 by coating a polyurethane layer.

The carrier is preferably in-extensible woven cloth for supporting the substrate 11 so that the substrate 11 can be laid flat on the coating machine for facilitating the coating of the middle layer 12 and ensuring even thickness of the middle layer 12 (or "highly solid-containing water-based polyurethane resin layer) over the entire substrate 11. Preferably, the substrate 11 is attached to the in-extensible carrier by water-based glue that does not leave any mark on the substrate 11 after releasing of the in-extensible carrier.

The provision of the superficial layer 13 on the middle layer 12 is preferably done in a dry adhesive process. Preferably, a polyurethane resin layer is coated on a flat or textured piece of releasing paper. After the polyurethane resin layer is dried, it is coated with a layer of a duo-solution polyurethane compound that is used as an adhesive layer. When the adhesive layer is not yet dry and is still sticky, it is attached to the middle layer 12 provided on the substrate 11. Then, the piece of releasing paper is removed so that the superficial layer 13 is made. Moreover, before the superficial layer 13 is cured, it is pressed by a textured roller so that the superficial layer 13 is made with the texture 14. Alternatively, after the superficial layer 13 is cured, an additional superficial layer can be attached to the superficial layer 13 by printing.

Figure 3:
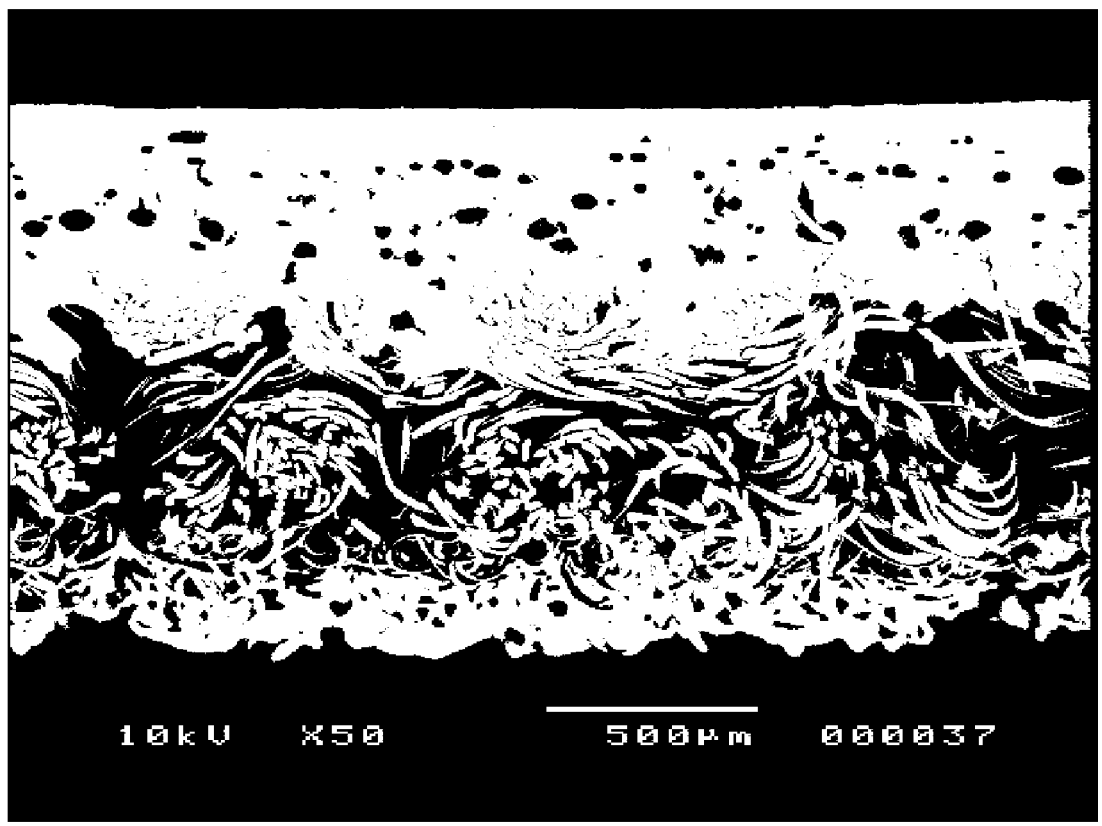
FIG. 3 is a microscopic photograph of the artificial leather shown in FIG. 1.

Referring to FIG. 3, a microscopic photograph of the artificial leather according to the present invention, the middle layer 12 is thick so that the artificial leather 1 is made of excellent strength against peeling, abrasion and dissolution. It has been proven in tests that the strength against peeling of the extensible artificial leather according to the present invention can be higher than 2.5 kg/cm.

The method according to the present invention will be described via the description of two embodiments.

In the first embodiment, ordinary woven cloth (or the "carrier") is used to support HY extensible cloth (or the "substrate 11") containing 70% of polyester and 30% of spandex. The substrate 11 is provided with a coating containing 94% of water-based polyurethane resin, 0.3% of pigment and 5.4% of adhesive agent that is caused to foam and well mixed by a machine. The coating is dried at 120 to 170 Celsius degrees. The ordinary woven cloth is removed so that a semi-product of the extensible artificial leather with the middle layer 12 is made. Solvent-type polyurethane resin is coated on a textured piece of releasing paper and dried at 100 to 130 Celsius degrees. Paste of solvent-type polyurethane resin is coated on the layer of solvent-type polyurethane resin and dried at 100 to 130 Celsius degrees. The layer of solvent-type polyurethane resin is attached to the semi-product by the paste of solvent-type polyurethane resin. After curing of the layer of solvent-type polyurethane resin (or the "superficial layer 13") and removal of the releasing paper, the extensible artificial leather 1 is made.

In the second embodiment, ordinary woven cloth (or the carrier) is used to support ME extensible cloth (or the "substrate 11") containing 100% of poly-ester. The substrate 11 is provided with a coating containing 94% of water-based polyurethane resin, 0.3% by weight of pigment and 5.4% of adhesive agent that is caused to foam and well mixed by a machine. The coating is dried at 120 to 170 Celsius degrees. The ordinary woven cloth is removed so that a semi-product of the extensible artificial leather with the middle layer 12 is made. Solvent-type polyurethane resin is coated on a textured piece of releasing paper and dried at 100 to 130 Celsius degrees. Paste of solvent-type polyurethane resin is coated on the layer of solvent-type polyurethane resin and dried at 100 to 130 Celsius degrees. The layer of solvent-type polyurethane resin is attached to the semi-product by the paste of solvent-type polyurethane resin. After curing of the layer of solvent-type polyurethane resin (or the "superficial layer 13") and removal of the releasing paper, the extensible artificial leather 1 is made.

The extensible artificial leather according to the first and second embodiments is compared with conventional extensible artificial leather regarding the strength against peeling, abrasion and dissolution is given in the following table:

|  | 1$^{st}$ Embodiment (1.2 mm) | 2$^{nd}$ Embodiment (0.9 mm) | Conventional Product (0.7 mm) |
| --- | --- | --- | --- |
| Cell Structure | Tiny and Dense | Tiny and Dense | Big and Loose |
| Peeling | 2.5 kg/cm ↑ | 2.5 kg/cm ↑ | 1.7 kg/cm |
| Abrasion | 3500 (1 LB) ↑ | 3500 (1 LB) ↑ | 2000 (0.5 LB) |
| Dissolution | 1 Week ↑ | 1 Week ↑ | 3 Days |

It is shown that the extensible artificial leather according to the present invention is better than the conventional extensible artificial leather regarding the strength against peeling, abrasion and dissolution while the former is as extensible as the latter. Therefore, the extensible artificial leather according to the present invention is suitable for sports gear that must provide comfort and excellent physical properties.

Moreover, the method according to the present invention uses the highly solid-containing water-based polyurethane resin to make the middle layer 12 without using volatile solvent that would vaporize and is used in a conventional wet process.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A method for making extensible artificial leather comprising:

bonding an extensible woven fabric substrate on in-extensible woven cloth with a water-based glue and firmly locating the extensible woven fabric substrate on a coating machine, the extensible fabric being extensible cloth with T-extensibility of 50% to 300% and Y-extensibility of 100% to 400%;

coating a foamed solid-containing water-based polyurethane resin on the extensible woven fabric substrate to form a middle layer with open cells;

drying the middle layer on the extensible woven fabric substrate and removing the in-extensible woven cloth from the extensible woven fabric substrate; and forming a superficial layer of polyurethane on the middle layer to make the extensible artificial leather.

2. The method according to claim 1, wherein coating the foamed solid-containing polyurethane resin includes coating the foamed solid-containing polyurethane resin having a porosity of 0.01% to 80% by volume on the extensible woven fabric substrate.

3. The method according to claim 1 or 2, wherein coating the foamed solid-containing polyurethane resin includes coating the foamed solid-containing polyurethane resin having a porosity of 2% to 65% by volume on the extensible woven fabric substrate.

* * * * *